United States Patent [19]

Smith

[11] Patent Number: 4,543,609
[45] Date of Patent: Sep. 24, 1985

[54] TELEVISION SURVEILLANCE SYSTEM

[75] Inventor: William V. Smith, Memphis, Tenn.

[73] Assignee: Lectrolarm Custom Systems, Inc., Memphis, Tenn.

[21] Appl. No.: 458,131

[22] Filed: Jan. 5, 1983

Related U.S. Application Data

[63] Continuation-in-part of Ser. No. 255,966, Jan. 19, 1981, Pat. No. 4,369,467, which is a continuation-in-part of Ser. No. 159,172, Jun. 13, 1980, Pat. No. 4,321,625, which is a continuation-in-part of Ser. No. 60,463, Jul. 25, 1979, Pat. No. 4,314,278, which is a continuation-in-part of Ser. No. 22,505, Mar. 21, 1979, Pat. No. 4,225,886, which is a continuation-in-part of Ser. No. 851,812, Nov. 16, 1977, Pat. No. 4,152,696.

[51] Int. Cl.⁴ .............................................. H04N 7/18
[52] U.S. Cl. .................................. 358/210; 352/179; 358/108
[58] Field of Search ................. 358/210, 108; 352/179

[56] References Cited

U.S. PATENT DOCUMENTS

| | | |
|---|---|---|
| 3,164,838 | 1/1965 | Heinrich ............................ 358/210 |
| 3,417,198 | 12/1968 | Loyd ................................. 358/210 |
| 3,798,368 | 3/1974 | Kardach ............................ 358/210 |
| 4,120,004 | 10/1978 | Coutta ............................... 358/210 |
| 4,152,696 | 5/1979 | Smith . | |
| 4,231,625 | 11/1980 | Perez ................................. 220/331 |
| 4,244,006 | 1/1981 | Kitahara ........................... 358/210 |
| 4,255,886 | 3/1981 | Klarman ............................ 160/379 |
| 4,314,278 | 2/1982 | Smith ................................. 358/210 |
| 4,321,625 | 3/1982 | Smith ................................. 358/210 |
| 4,387,301 | 6/1983 | Wirick .................................. 374/2 |

Primary Examiner—Howard W. Britton
Attorney, Agent, or Firm—Odin, Feldman & Pittleman

[57] ABSTRACT

A television surveillance system is disclosed. A first embodiment of the invention is a system for selecting sectors of rotation of a camera that are contained within predetermined angular limits of rotation of the camera. The system for selecting sectors of rotation include a camera, rotating means for rotating the camera within and between predetermined angular limits, and a mechanism for selectively limiting the rotation of the camera to a sector contained within the predetermined angular limits, and a mechanism for selectively limiting the rotation of the camera to a sector contained within the predetermined angular limits. A second embodiment of the invention is a system for changing the mode of operation of a camera from a first mode to a second mode of operation. The system includes a control system for selecting a first mode of operation of a camera, a mechanism coupled to the control system for generating a change of mode of operation signal when the camera has operated in the selected mode for a time inverval, and a mechanism coupled to the means for generating a change of mode of operation signal for causing the control system to operate the camera in a second mode of operation upon the generation of the change of mode of operation signal.

14 Claims, 5 Drawing Figures

TELEVISION SURVEILLANCE SYSTEM

CROSS REFERENCE TO RELATED APPLICATION AND PATENTS

This patent application is a continuation-in-part of U.S. patent application Ser. No. 225,966 filed Jan. 19, 1981 entitled VIDEO CAMERA MONITORING SYSTEM and now U.S. Pat. No. 4,369,467, which is a continuation-in-part of Ser. No. 159,172 filed June 13, 1980, now U.S. Pat. No. 4,321,625 entitled CONTROL SYSTEM, issued Mar. 23, 1982 which is a continuation-in-part of Ser. No. 60,463 filed July 25, 1979, now U.S. Pat. No. 4,314,278 entitled CONTROL SYSTEM, issued Feb. 2, 1982, which is a continuation-in-part of Ser. No. 22,505 filed Mar. 21, 1979, now U.S. Pat. No. 4,225,886 entitled VIDEO CAMERA CONTROL SYSTEM, issued Sept. 30, 1980, which is a continuation-in-part of Ser. No. 851,812 filed Nov. 16, 1977, now U.S. Pat. No. 4,152,696, issued May 1, 1979. The subject matter of the application and the patents are hereby incorporated by reference.

Applicant's above referenced application and patents disclose television monitoring systems which use a central control location to control the operation of remote cameras to conduct surveillance. A switching network is used to decode a control signal which may assume any one of a plurality of voltage levels. Each voltage level of the control signal is used to activate a separate camera function on a single camera or separate cameras including the execution of pre-set interval scanning and the positioning of a camera in any one of a plurality of preselected positions.

BACKGROUND OF THE INVENTION

The present invention relates to systems for controlling the operation of cameras. More particularly, the invention relates to camera control systems which permit the selection of scanning of a sector of the total possible field of rotation of the camera and to camera control systems which change the mode of operation of the camera from a first mode of operation to a second mode of operation after the operation of the camera in the first mode of operation for a predetermined time interval.

Television surveillance systems have been used for many years to monitor remote areas from a central control location. These systems typically have a television camera rotatably driven to scan back and forth between predetermined angular limits to conduct surveillance within the field of view. These systems have the disadvantage of being limited to scanning the entire field of view defined by the predetermined angular limits. With these systems it is impossible to concentrate the scanning camera to a sector within the predetermined angular limits of rotation of the camera where it is desirable to concentrate surveillance. The presence of unusual activity in a sector contained within the angular limits of rotation or the variance of light conditions over a period of time within parts of the angular limits of rotation make it desirable to be able to selectively vary the field of scanning from the entire field defined by the predetermined angular limits to a sector contained therein.

Known television surveillance systems have employed various modes of operation in which the system continually operates in a single mode of operation until the operator changes the mode of operation. The continued operation of a surveillance system in a new mode of operation often occurs long after the condition which warranted the change in the previous mode of operation to the new mode has ceased to exist. The failure of these systems to revert to the previous mode of operation or to another mode of operation without operator intervention after the elapsing of a time interval is a serious disadvantage which often results in ineffective system operation and diminished surveillance capability.

SUMMARY OF THE INVENTION

It is an object of the present invention to provide a television camera surveillance system which has the capability to selectively concentrate surveillance on sectors contained within predetermined angular limits of rotation of the camera to observe conditions of special interest or to areas within the angular limits having light conditions in which effective surveillance is possible.

A television surveillance system in accordance with the invention includes a system for selecting sectors of rotation of a camera that are contained within predetermined angular limits of rotation of the camera. With this system, the field of scan of the camera may be concentrated on sectors of particular interest contained with the predetermined angular limits of rotation of the camera. Typically, sectors of interest arise when an unusual condition occurs such as a disturbance which attracts the attention of the operator at the central control location of the overall surveillance system or upon the changing in light conditions which over a period of time make effective surveillance in certain sectors of rotation difficult or impossible.

A system for selecting sectors of rotation of a camera that are contained with predetermined angular limits of rotation of the camera includes a camera, rotating means for rotating the camera within and between the predetermined angular limits of rotation, reversing means for causing the direction of rotation of the camera to reverse when the camera reaches one of the predetermined angular limits, and means for selectively limiting the rotation of the camera to a sector contained within the predetermined angular limits.

Further in accordance with this system for selecting sectors of rotation, means are provided for selectively limiting the rotation to any one of a plurality of different sectors within the predetermined angular limits of rotation. Each of the different possible sectors is defined by a pair of reversing-switching means. The reversing-switching means may be located at the predetermined limits of rotation and at one or more points located between the limits of rotation.

The means for selectively limiting the rotation of the camera includes means for producing a sector selection signal for initiating limitation of the rotation of the camera to a sector within the predetermined angular limits, a plurality of switching means each being coupled to a different one of the reversing-switching means located between the angular limits of rotation, and means responsive to the signal for activating one of the plurality switching means producing a signal in response to rotation of the camera to the angular position of the reversing-switching means which causes the reversing means to reverse the direction of rotation of the camera when the switching means to which the reversing-switching means is coupled.

In addition, the system for selecting sectors of rotation of a camera further includes an additional reversing-switching means located within the predetermined angular limits of rotation. The additional reversing-switching means is coupled to the reversing means for reversing rotation of the camera in response to the rotation of the camera to the angular position of the additional reversing-switching means. The additional reversing-switching means causes the camera to reverse its direction of rotation to a direction of rotation opposite the direction of rotation caused by the other reverse-switching means which previously caused the direction of rotation of the camera to reverse.

The invention includes a second embodiment for changing the mode of operation of a camera. The second embodiment of the invention causes a television surveillance system to change its mode of operation from its current mode of operation to a previous mode of operation or to another mode of operation upon the expiration of an elapsed time interval. This system has the advantage of increasing surveillance capability and efficiency by eliminating the continuation of a scanning mode after the condition which warranted the change to that scanning mode has ceased to exist.

A system for changing the mode of operation of a camera in accordance with the invention includes a control system for selecting a first mode of operation of a camera, means coupled to the control system for generating a change of mode of operation signal when the camera has operated in the selected mode for a time interval and means coupled to the means for generating a change of mode of operation signal for causing the control system to operate in a second mode of operation upon the generation of the change of mode of operation signal. The first and second modes may be any known camera modes of operation.

There are numerous examples of the first and second modes. The selected first mode of operation may be any auto-scan function in which the camera is continually scanning between build in predetermined angular limits of rotation and the second mode of operation is the positioning of the camera at a predetermined position. The auto-scan function may be an auto-pan scanning of the camera. The first mode of operation may be the positioning of the camera at a predetermined position and the second mode of operation of the camera may be the positioning of the camera at another predetermined position. The first mode of operation may be an auto-scan function and the second mode of operation may be the stopping of the panning of the camera at the position at which the camera is positioned when the change of mode of operation signal is generated. The selected first mode of operation may be an auto-scan function and the second mode of operation may be an interval scan function. The selected first mode of operation may be the positioning of the camera at a predetermined position and the second mode of operation may be an interval scan function.

DESCRIPTION OF THE PREFERRED EMBODIMENTS

Figure 1:
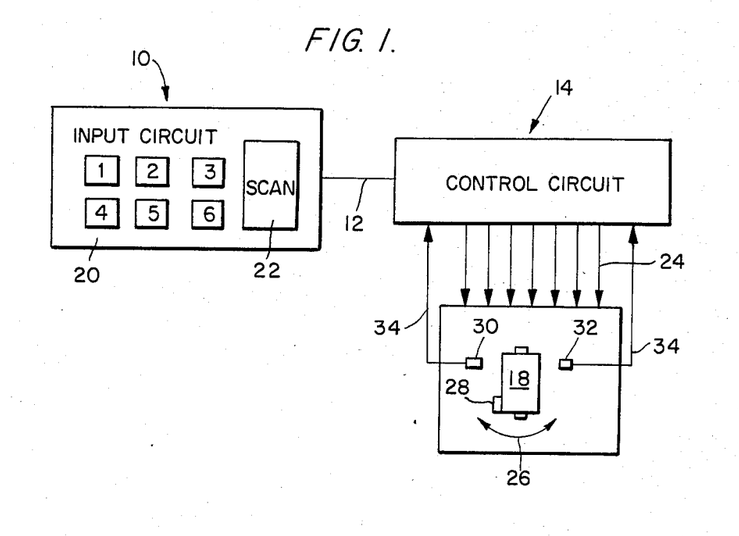
FIG. 1 is a schematic illustrating a television surveillance system using a single camera of the type described in applicant's above referenced patents and application.

FIG. 1 illustrates a control system in accordance with that illustrated in applicant's above referenced U.S. Pat. Nos. 4,321,625 and 4,314,278. The control system includes two basic circuits, an input circuit 10 and a control circuit 14. The input circuit 10 provides a plurality of constant voltage levels which are coupled through transmission line 12 to control circuit 14. As illustrated, input circuit 10 is capable of providing seven different voltage signals with each of the signals being used to activate a different control function of a video camera 18. The particular voltage level signal which is applied is dependant upon which of a plurality of buttons 20 or scan button 22 is pressed on the input circuit 0. To choose a mode of operation, the operator of the system presses one of the buttons which causes the production of an appropriate voltage level signal which is coupled to the control circuit 14. The control circuit 14 detects that voltage level signal and produces an output signal on one of the plurality of lines 24 to selectively activate one of the various control functions of the video camera 18. The video camera 18 is mounted on a rotatable pedestal (not illustrated) to permit rightward and leftward movement as illustrated by arrow 26. A magnet 28 is mounted for movement with the video camera 18 to actuate a pair magnetically operated position sensing switches 30 and 32 to provide positive feedback signals to control circuit 14 via a pair of input lines 34 to indicate right and left camera orientation. The position of the switches 30 and 32 determines the predetermined angular limits of rotatime of the video camera 18. When the camera rotates to one of the predetermined rotational positions of the switches 30 or 32, the direction of rotation is reversed to cause the camera to rotate toward the other position reversing switches 30 and 32. The reversing switches 30 and 32 are normally provided by the manufacturer of the camera and its associated rotation system to define the fixed predetermined angular limits of scan of the camera.

Figure 2:
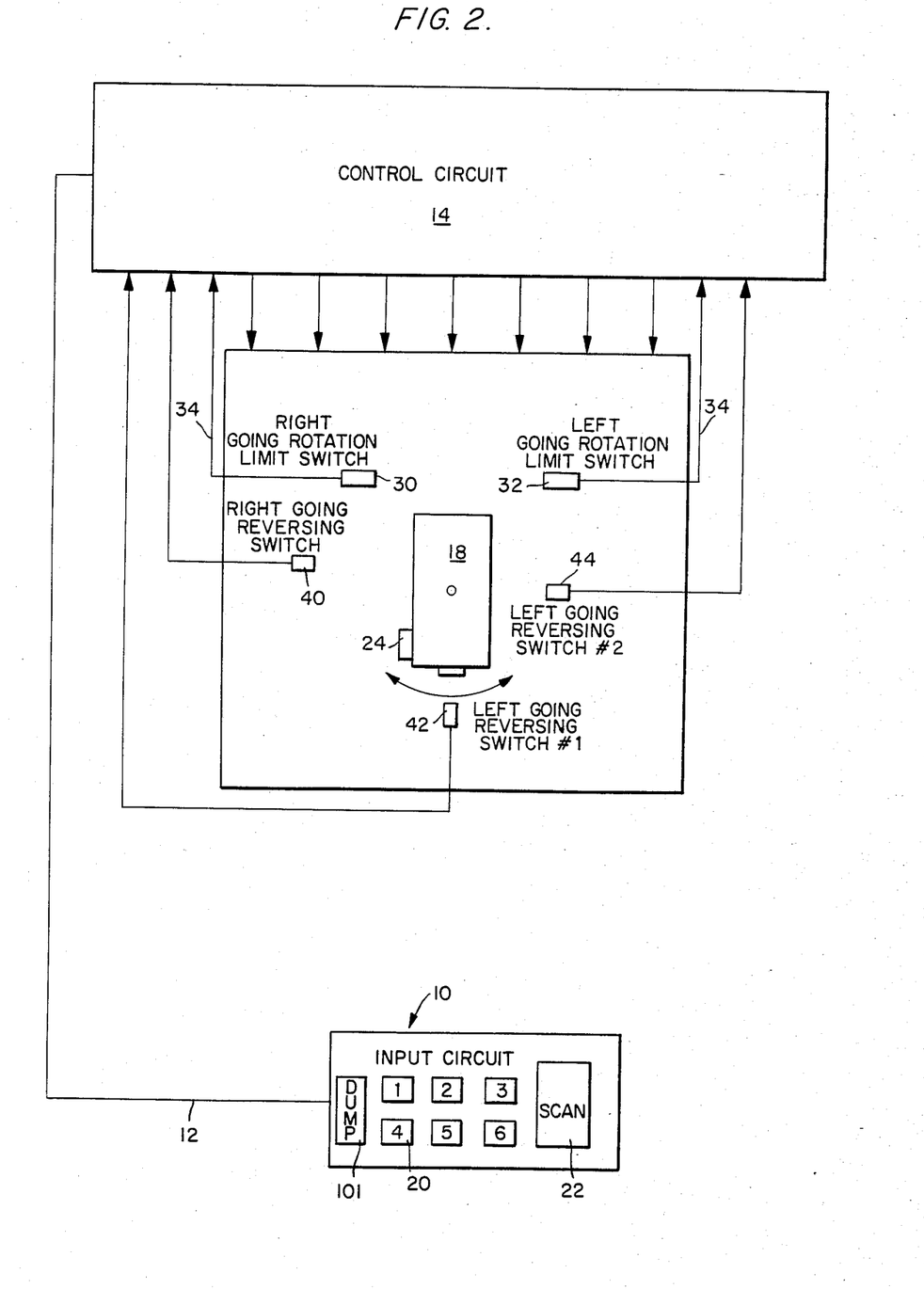
FIG. 2 is a schematic of a television surveillance system in accordance with the present invention.

FIG. 2 illustrates a television camera surveillance system in accordance with the invention. The system of FIG. 2 differs principally from that of applicant's previous television camera systems, which have been generally illustrated as in FIG. 1, by the provision of a plurality of additional reversing switches within the predetermined angular limits of rotation which are defined by the reversing switches 30 and 32. Like reference numerals identify the same parts in FIGS. 1 and 3.

In the preferred form of the invention, a right-going reversing switch 40 and a first left-going reversing switch 42 and a second left-going reversing switch 44 are disposed within the predetermined angular limits of rotation defined by the previously described reversing switches 30 and 32. Each of the reversing switches 40, 42, and 44 are actuated (closed) by the rotation of the camera to an angular position so that the magnetic element 28 rotates in close proximity to the individual reversing switches 40, 42, and 44. Depending upon the angular orientation of the camera at that time of generating a sector selection signal by actuating a control 101 on the input circuit, the field of rotation will be limited to a sector contained between either the right-going reversing switch 40 and the left-going reversing switch 42 or to a sector contained between the right-going reversing switch 40 and the second left-going reversing switch 44. When the right-going reversing switch 40 is disposed between the right-going rotation limit switch 30 and the left-going rotation switch 32, rotation of the camera 18 to the angular position of the right-going reversing switch 40 will always cause the camera to reverse its direction of rotation. If this mode of operation is undesirable, the right-going reversing switch may be physically located at the same rotational position limit switch 30.

Figure 3:
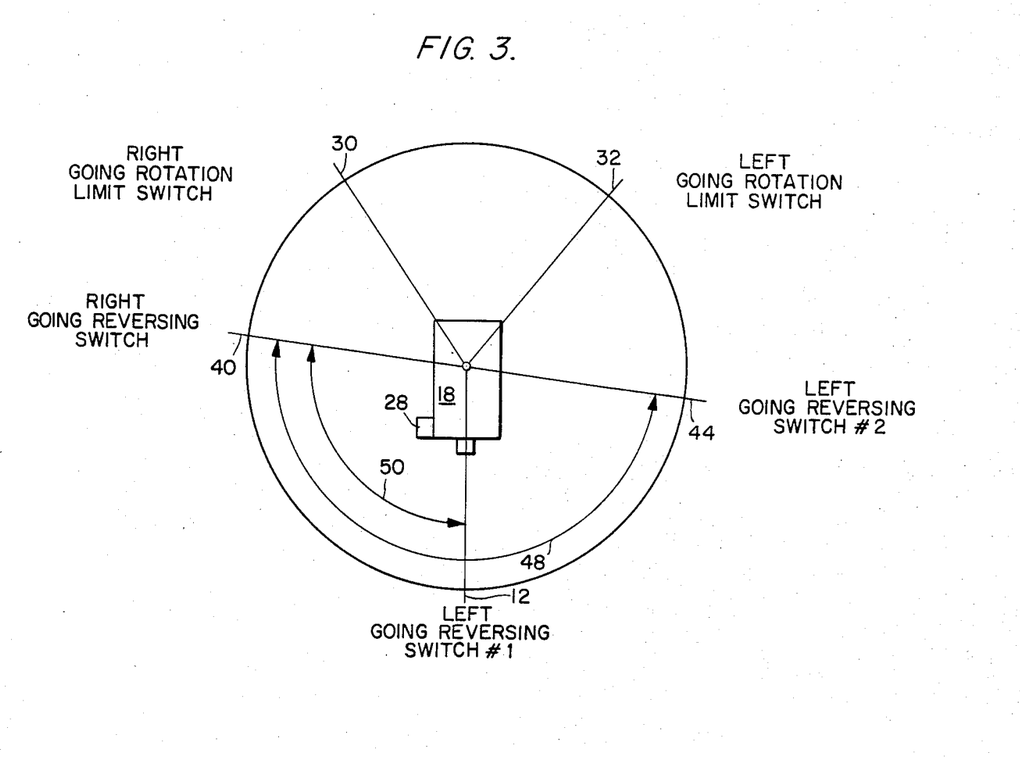
FIG. 3 is a disgram illustrating the various sectors of rotation of a single camera which are selectable in accordance with the present invention.

FIG. 3 illustrates the various possible angular sectors of rotation which are possible with the camera control system of the present invention. FIG. 3 has been simplified to omit the presence of the input and control circuits illustrated in FIG. 2. If the camera is disposed between the right-going reversing switch 40 and the left going reversing switch 42 at any time during the initiation of scanning of a sector, the camera will ultimately rotate counterclockwise past switch 40 into a sector of rotation defined by the angular position of the right-going rotation limit switch 30 and one or the other of the left-going reversing switches 42 or 44 depending upon the state of actuation of the switches (FIGS. 4 and 5) associated with the switches 32 and 44. Similarily, if the camera 18 is located between the left-going reversing switches 42 and 44, and at the time of initiation, the camera will ultimately rotate clockwise past the left-going reversing switch 44 into a sector defined by the right-going reversing switch 40 and one or the other of the left-going reversing switches 42 and 44 depending upon the state of actuation of the switches associated with the switches 42 and 44. Once the camera rotates within a sector which has been selected, it will continue to rotate in the sector until the operator selects a new sector or until the expiration of a predetermined time limit occurs.

From the foregoing description, it will be apparent that different sectors of rotation defined by the right-going reversing switch and one of the left going reversing switches 42 and 44 may be selected. The capability of selecting the sectors of rotation permits the concentration of camera surveillance on areas of particular interest such as occur when disturbance is noted or when lighting conditions change over a period of time which prevent the effective surveillance of certain sectors of the field of view of the camera 18 because of insufficient light.

Figure 4:
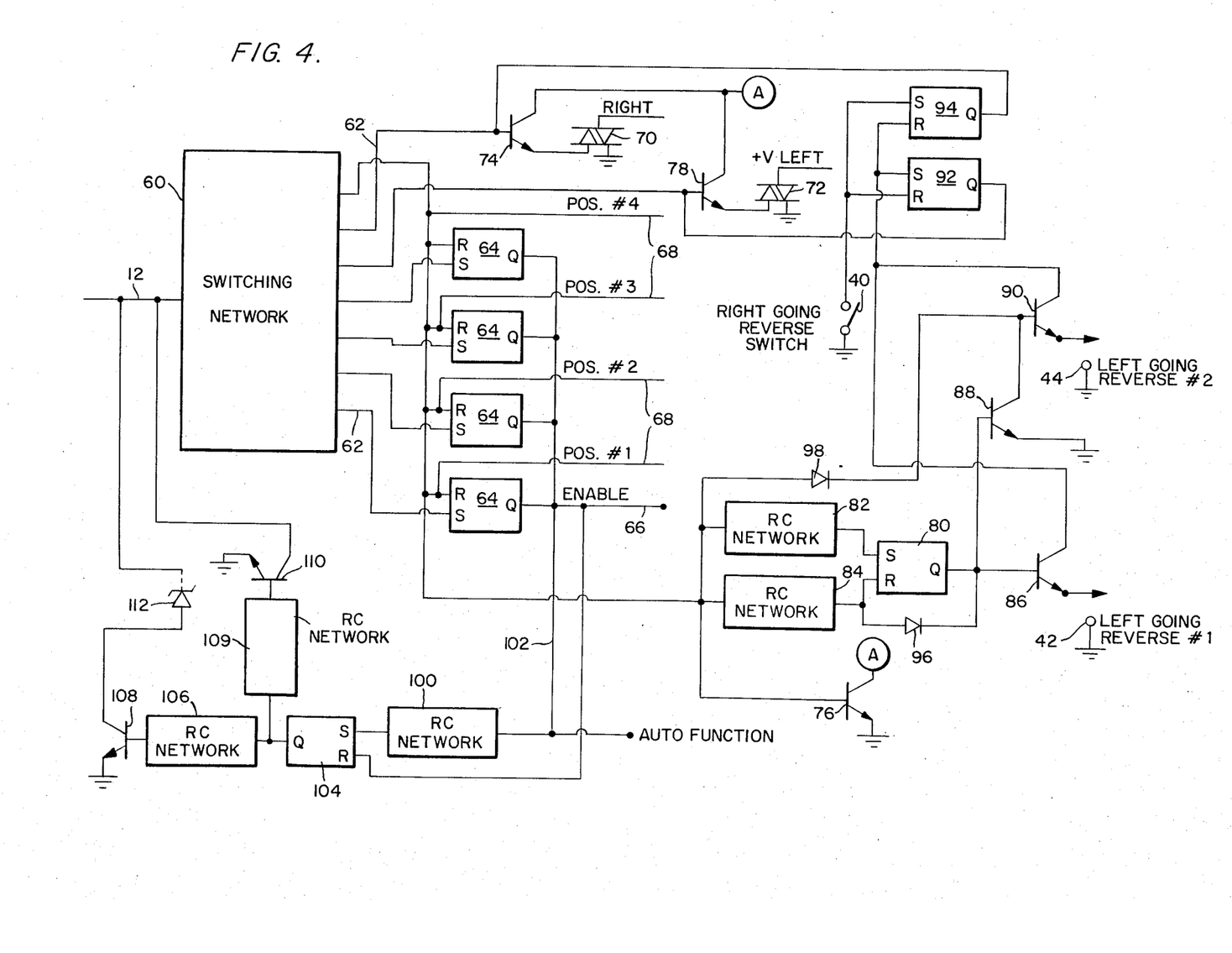
FIG. 4 is an electrical schematic of the control system used in the present invention.

FIG. 4 illustrates an electrical schematic of the first and second embodiments of the invention. Switching network 60 is coupled to the control line 12 running from the input circuit 10 (FIG. 2) for detecting the various possible voltage levels contained in the control signal to produce an output signal on one of the seven output lines 62. In the preferred form of the switching network 60, which is described in detail in the applicant's above referenced application and patents and in FIG. 5 infra, any one of the seven different possible input voltage levels is detected to produce an output signal on one of the seven output lines 62 to activate the control function associated with that particular output line. The bottom four output lines 62 are coupled respectively to the set input of flip-flops 64. The Q output of the four flip-flop 64 is coupled to a common enable line 66. The presence of a signal on the enable line 66 activates the camera rotating mechanism (not illustrated) which causes the camera 18 to rotate until the magnet 28 reaches the position switch (not illustrated) which is coupled to the reset line of the activated flip flop. The respective flip-flops 64 cause the camera to rotate to any one of four predetermined positions which are respectively labled by position number. A position switch (not illustrated) is associated with each reset line 68 which couples the pulse produced by rotation of the camera (magnet 28) to the predetermined position associated with that particular position switch to the associated flip-flop 64. For the sake of clarity, the position switches have not been illustrated in any of the drawings. The actual connection of the position switches to the reset line 68 is similar to that illustrated in FIG. 6 of the applicant's above referenced U.S. Pat. No. 4,314,278. When the camera 18 rotates to the position of one of the switches associated with the four positions, a pulse is generated which is coupled via associated reset line 68 to the flip-flop 64 associated with that position. The pulse causes that flip-flop 64 to change state which causes the Q output of that flip-flop to change from a high state to a low state which disables rotation of the camera 18 at that position by changing the state of the enable line 66 from high to low. When the enable line 66 goes from high to low either the right triac 70 or the left triac 72, which had been previously enabled while the camera was rotating to the predetermined position, is disabled causing power to be disconnected from the camera rotating mechanism (not illustrated).

Two of the outputs 62 are coupled to the right rotation and left rotation drive circuits for the camera which include the aforementioned triacs 70 and 72. The right rotation drive circuit has the output 62 coupled to the base of transistor 74. The collector of transistor 74 is coupled to point A which is also coupled to the collector grounding transistor 76 which is described infra. The emitter of transistor 74 is coupled to the control gate of triac 70 to produce right hand rotation of the camera when transistor 74 is turned on by the presence of an output pulse on the line 62 coupled to the base of transistor 74. The left-going rotation circuit for the camera 18 includes a transistor 78 which has its base collected to the output 64 in a manner similar to that described above with the right-going rotation drive. The collector of transistor 78 is coupled to the collector of the previously described grounding transistor 76. An output pulse on the line 62 which is coupled to the base of transistor 78 causes transistor 78 to turn on to activate the triac 72. Activation of the triac 72 causes the camera to rotate in the leftward direction.

The top output line 62 of the switching network 60 is used to activate the selection of a sector of rotation within the predetermined angular limits of rotation defined by the right-going rotation limit switch 30 and the left-going rotation limit switch 32. The selection of a sector of view is initiated by a sector selection signal initiated by the operator of the control system. The sector selection signal which is produced on the top line 62 from the switching network 60 must be present for a minimum time interval. The sector selection signal is applied to a flip-flop 80 via two RC networks 82 and 84 respectively. The networks are identical and have the characteristic that they will charge up to a potential which is sufficient to cause a change in the flip-flop output state after the aforementioned minimum time interval has elapsed which preferably is 12 seconds. The Q output of the flip-flop 82 is applied to the bases of transistors 86 and 88. The emitter of transistor 86 is coupled to the left-going reversing switch 42. The collector of transistor 88 is coupled to the base of transistor 90. The emitter of transistor 88 is coupled to the left-going reverse switch 42. The transistor 88 functions to cause one of the transistors 86 or 90 to be turned off while the other one is turned on for any output state of the Q output of the flip-flop 80. The collectors of the transistors 86 and 90 are coupled in common to the set input of the flip-flop 92 and the reset input of the flip-flop 94. Any change in output state of the flip flop 80 will cause one of the transistors 86 and 90 to turn on and the other one to turn off. The change in states of the transistors 86 and 90 will cause the production of a pulse on the common collector line which is coupled to the flip-flops 92 and 94 such that the flip-flop 94 will be placed in the set condition and the flip-flop 94 will be placed in the reset condition. The change in output states of the flip-flops 92 and 94, which respectively have their Q outputs coupled to the base of transistor 78 and the base of transistor 74 causes the left-going triac 72 to be turned on and the right-going triac 70 tp be turned off to cause the television camera to rotate to the left when the grounding transistor 76 is not turned on. The production of a pulse caused by the rotation of the camera 18 to the angular position of the right-going reverse switch 40 causes the states of the flip-flops 92 and 94 to be respectively be reset and set to cause the left-going triac 72 to be turned off and the right-going triac 70 to be turned on.

Thus it may be seen that for any steady state output condition of the flip-flop 80, one of the two left-going reversing switches 42 and 44 will be coupled to the flip-flops 92 and 94 as a result of transistor 88 being turned on or off. When the camera rotates past the angular position of that left-going reversing switch 42 or 44, a pulse will be produced which will respectively set the Q output of flip-flop 92 to a high condition and reset the Q output of the flip-flop 94 to a low position which will cause the camera to reverse its direction from rotation to the right to start rotating towards the left as a consequence of the turning on of triac 72. The right-going reversing switch 40 is independent of the output state of flip-flop 80 and therefore is effective to reverse the camera to rotate towards the right each time the camera rotates to the angular position of the right-going reversing switch 40.

The function of the RC network 82 and 84 is to preclude the changing of state of the flip-flop 80 unless the section selection signal is present on the top output line 62 of the switching network 64 for a period of time greater than a predetermined time interval. After the signal has been present for at least the predetermined time interval, the level of the signal becomes sufficient to cause the set or reset input to flip-flop 80 to reach a state sufficient to cause a change in the output state of the Q output. If the Q output is in a h-gh steady state condition, the first diode 96 will be reverse biased which will prevent the shunting of the voltage level building up in the first RC network 84. Once the voltage level in the RC network 84 reaches a certain level, the reset input reaches a sufficient magnitude to cause the Q output of flip-flop 80 to change from a high level to a low level. When the Q output of flip-flop 80 is high, the transistor 88 will be turned on which will cause an inversion to occur at the collector which will forward bias the diode 98 which will shunt the sector selection signal from the RC network 82 to prevent the signal to reach a sufficient level to cause the activation of the set input. Once the Q output of flip-flop 80 has gone low, the condition states of the diodes 96 and 98 are reversed so that diode 96 is forward biased and diode 98 is reversed biased. The continued application of the sector selection signal to the RC network 82 and 84 will charge up the RC network 82 after the predetermined time interval to a potential which is sufficient to set the flip-flop 80 to cause the Q output to go high. The function of the flip-flop 80 is to activate either the transistor 86 or the transistor 90 to permit coupling of the pulses generated by the passage of the camera in proximity to either the left-going reverse switch 42 or the left-going reverse switch 44 to the circuitry for causing the direction of the camera to rotate from the right-going direction to the left-going direction. The function of the grounding transistor 76 is to turn off the transistors 74 and 78 associated with the right-going and left-going triacs 70 and 72 respectively to cause the rotation of the camera to immediately stop while the sector selection signal is present.

In the present embodiment of the invention, the sector selection signal is produced by a "dump" button 101 (FIG. 2) contained on the control panel which must be depressed manually for the predetermined interval to cause the change in state of the flip-flop 80. The depressing of the dump button on the input circuit produces a voltage level which is of a level to cause the switching network 60 to produce an output signal on the top line 62. A detailed description of the switching network 60 is made supra in conjunction with FIG. 5.

FIG. 4 also illustrates another embodiment of the invention which functions to change the mode of operation 18 of the camera from a first mode to a second mode after the elapsing of the predetermined time interval. With this embodiment, each of the Q outputs of the flip-flops 64 are coupled to a RC network 100 which functions to inegrate the Q output signal from one of the flip-flops 64 on line 102. The RC time constant of the network 100 is chosen such that in the preferred embodiment it takes approximately 2½ minutes for the network 100 to integrate the signal on the output line 102 to a level sufficient to cause the flip-flop 104 to produce a high level signal on the Q input. The Q output of flip-flop 104 is applied to RC network 106 which Q activates transistor 108 for a first time interval and to RC network 109 which activates transversely 110 for a second time interval. The second time internval is less than the first time interval. The turning on of transistor 110 grounds the input 12 to the switching network. The RC network 109 causes the signal applied to the bore of transistor 110 to decay which causes transistor 110 to turn off after the expiration of the second time interval. Because the RC network 106 does not cause the signal applied to the base of transistor 108 to decay as rapidly as the decay of the signal applied to the base of transistor 110 by RC network 109, transistor 108 stays turned on after transistor 110 has turned off thus causing a control signal having a magnitude determined Zener diode 112 to be applied to input 12 of switching network 60. The designation "AUTO FUNCTION" appears on an input to the RC network 100. The AUTO FUNCTION input is from other circuit boards (not illustrated) which control different camera functions. The signals which appear on the AUTO FUNCTION input are generated by other flip-flops, identical to flip-flops 64, which control different automatic camera functions such as an "auto up", "auto down" and "auto pan".

The control signal applied by transistor 108 may be any one of a plurality of different types. As illustrated in FIG. 4, a Zener diode 112, having a breakdown voltage equal to one of the Zener diodes contained with in the switching network 60, is coupled between the input to switching network 60 and the collector of transistor 108. The activation of transistor 108 causes a control voltage having a magnitude equal to the breakdown potential of Zener diode 112 and equal to one of the plurality of possible voltage levels that are normally applied to the input of switching network 60 to be applied to the input of the switching network. The control voltage which is applied to the input of the switching network 60 by Zener diode 112 causes the camera to rotate to one of the plurality of the four predetermined positions which have been discussed supra. The breakdown potential of the Zener diode 106 may be chosen to cause the production of an input signal which is equal to any one of the plurality of possible input voltage levels to cause the production of an output pulse on any one of the output lines 62 of the switching network 60 to activate any desired function of the camera including the positioning in predetermimed positions or any other function. Alternatively, the Zener diode 112 may be omitted and the collector of the transistor 108 may be directly coupled to circuitry (not illustrated) for producing an interval scan camera function. The production of an interval scan function is described in applicant's previous U.S. Pat. Nos. 4,314,278 and 4,321,625. With an interval scan function, the television camera is caused to rotate between a plurality of preset positions and to dwell at each position for a determined time interval. Alternatively, the interval scan function may involve the random positioning of the television camera in any one of a plurality of possible positions at which positions the camera would dwell for a predetermined time interval.

It is also within the scope of the invention to activate any type of programmed camera positioning sequence by elimination of the Zener diode 112 and coupling the collector of transistor 108 directly to control circuitry for causing that circuitry to be activated after the transistor 108 is turned on. Thus, the camera system may be made to revert to any programmed mode of operation after the camera has operated in its new mode for the predetermined time interval.

The flip-flop 104 is reset by the production of a high level pulse on any one of the Q outputs of the flip-flops 64 to ensure that the newly selected mode of operation of the camera will only last for the predetermined time interval before the camera reverts to another mode.

Figure 5:
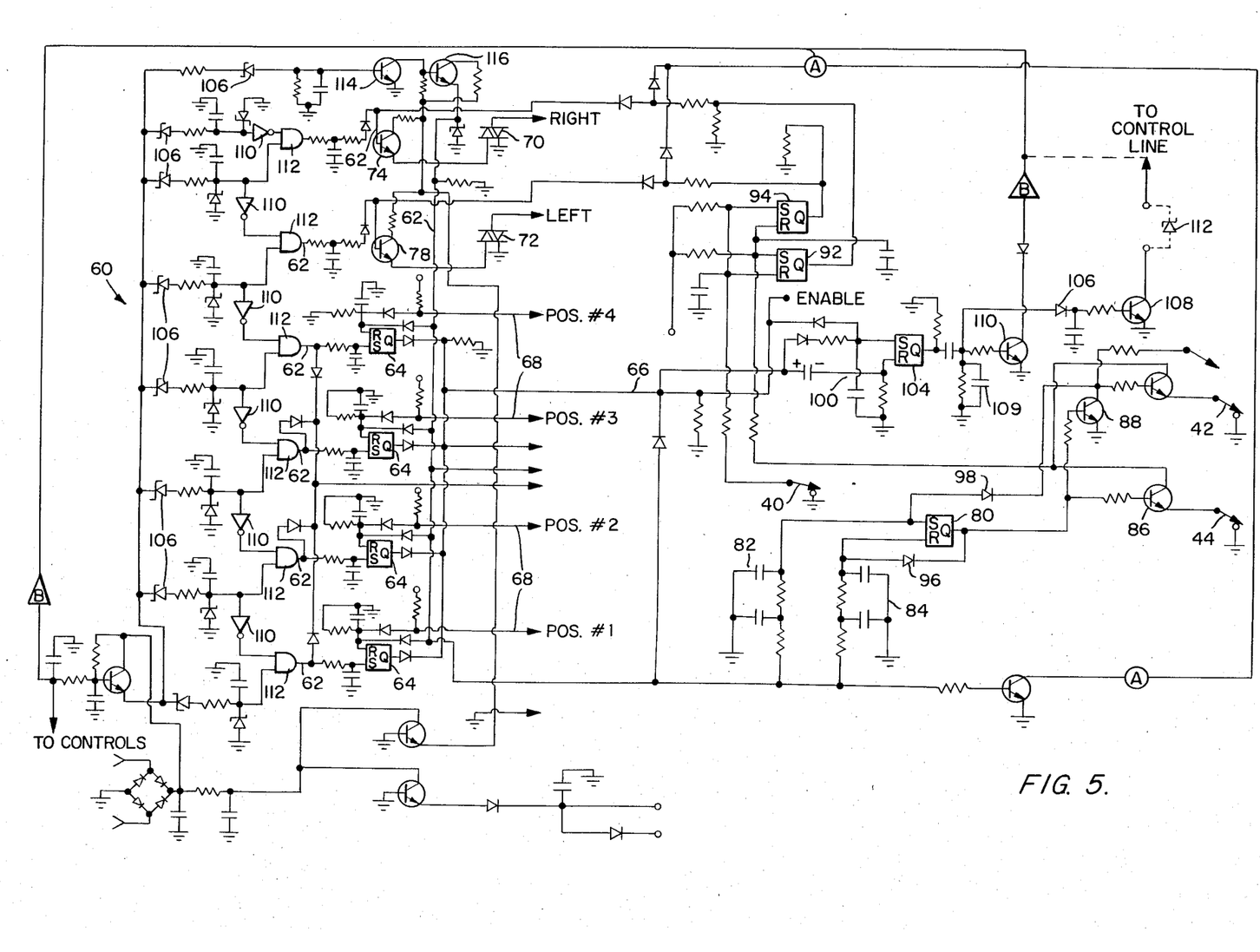
FIG. 5 is a detailed electrical schematic of the preferred form of control system used with the present invention.

FIG. 5 illustrates a detailed electrical schematic of FIG. 4. The same reference numerals have been used in FIGS. 4 and 5 to identify identical parts. The switching network 60, is comprised of a plurality of Zener diodes 106 having different breakdown potentials which function effectively as switches. Each of these Zener diodes 106 is actuated only when the applied voltage is above a certain predetermined level with the predetermined level associated with each switching circuit being different. The Zener diode 106 at the top has the highest breakdown potential with each succeeding lower Zener diode having a breakdown potential lower than the Zener diode above it. Each of the Zener diodes 106 only passes current when the applied voltage exceeds its breakdown voltage. Thus if a voltage in excess of the breakdown voltage of the top Zener diode 106 is applied, then all of the Zener diodes 106 will conduct current including the Zener diode at the top having the highest breakdown voltage. The outputs for each of the Zener diodes 106 are coupled to a corresponding inverter 110. The output of the inverter 110 is coupled to an And gate 112. Each inverter 110 and associated And gates 112 functions as a blocking means which provides a blocking signal for preventing the Zener diodes 106 with a lower breakdown potential from producing a control signal. The other input of each of the And gates 112 is from the Zener diode having the next highest breakdown voltage. Each of the inverters upon being actuaged by the breaking down of the associated Zener diode 106 provides an appropriate logic signal which disables the associated And gate 112. In this manner, only signals from the highest level Zener diode 106 that is activated pass through the associated And gate 112. Thus the switching network 60 detects any one of the possible input voltage levels and produces a signal output signal on the associated line 62 when a particular voltage level is present in the input signal. When the top Zener diode 106 is activated by the "dump" button 101 being depressed on the panel of the input circuit 10, transistor 114 is activated and transistor 116 is turned off. The emitter of transistor 116 functions to couple the sector selection signal to the RC networks 82 and 84. The second and third outputs 62 of the And gates 112 respectively drive the right and lef-going rotational controls of the television camera. When a control voltage is applied which breaks down the Zener diode 106 associated with the right going rotational control, the camera 18 will continue to rotate to the right under the manual control of the operator. In a similar manner, when a voltage is applied which will breakdown the Zener diode associated with the left-going rotational control, the camera 18 will continue to rotate manually to the left under the control of the operator. As described above with reference to FIG. 4, the flip-flops 64 are driven by different output lines 62 of the switching network. Certain lines which couple the individual Q outputs of the flip-flops to other circuit boards have been omitted for the reason that they do not illustrate subject matter which consitutues part of the invention. The function of the transistor 116 is to cause the resetting of each of the flip-flops 64 prior to the change of state from the first mode of operation to a second mode of operation upon the elapsing of a predetermined time interval. The RC network 100 is designed such that the set input of the flip-flop 104 will be triggered when the enabled signal has been integrated on the output of the RC network to a voltage which is equal to approximately ½ of the magnitude of the input enable signal. When this potential is reached, the set input causes the flip-flop 102 to change state to produce a high level signal on the flip-flop.

The remainder of the detailed circuitry in FIG. 5 will not be discussed for the reason that it is not essential to understanding the operation of the invention.

OPERATION

The sector of rotation of the camera 18 which is scanned is determined by several factors. First, the position of the right-going switch 40 determines the maximum left hand rotation of the camera 18. If right-going reversing switch 40 is located at the same position as the right-going rotation limit switch 30, the camera will rotate to the left to the maximum predetermined limit. The right going reversing switch may be positioned anywhere within the predetermined angular limits of rotation determined by switches 30 and 32. If the sector selection signal has caused the flip-flop 80 to have the Q output in the high state, the left-going reversing switch 44 will be disabled from causing the camera to reverse its direction of rotation from the right to the left when the camera rotates to the position of the left-going reversing switch 44. With the Q output high for the flip-flop 80, and the camera disposed with the arc 48, the sector of rotation will be located between the right-going reversing switch 40 and the left-going reversing switch 42.

The camera will continue to rotate back and forth between the right-going reversing switch 40 and the left-going reversing switch 42 until the output of the RC network 100 reaches aporoximately one-half of the magnitude of the enable signal. The RC 100 network functions as a timing mechanism for causing the mode of operation of the camera to change from a first mode to a second mode after the elapsing of the predetermined time interval determined by the RC time constant of the RC network 100. The mode of operation to which the camera changes after the elapsing of the predetermined time interval is dependent upon the breakdown potential of Zener diode 112 which will cause the camera to assume a predetermined position. The breakdown potential of Zener diode 112 may be chosen to activate some other camera function such as an interval scanning function or other programmed movement of the camera. For each of the sectors of rotation discussed with regard to FIG. 3, the camera will change its mode of operation after the elapsing of the predetermined time interval from the scanning of the sector of interest to some other mode of camera operation. It the Q output of the flip-flop 80 is low after the generation of a sector selection signal, the left-going reversing switch 44 will be coupled to the left-going rotation circuiting including triac 72 which will cause the direction of the camera to reverse from the right to the left when the camera rotates to the position of the left-going reversing switch 44. While the Q output of flip-flop 80 is low, the camera 18 will reciprocate between the right-going reversing switch 40 and the left-going reversing switch 44 as indicated by arc 50. Thus, the operators depressing of the dump button 101 for at least a minimum time interval determines whether the camera will automatically rotate between the right going reversing switch 40 and the left-going reversing switch 42 (short vector 50) or between the right-going reversing switch 40 and the left going reversing switch 44 (long vector 48).

In addition to changing the mode of operation of the camera from scanning within a particular sector of the overall field of view to another mode of camera operation after the elapsing of a predetermined time interval, the invention may be used to change the mode of operation of the camera from any mode to another mode after the elapsing of a predetermined time interval. The invention as illustrated in FIG. 5 would also change the mode of operation from positioning of the camera at a predetermined position (positions 1–4) to another mode of operation after the elapsing of the predetermined time interval.

I claim:

1. A system for selecting sectors of rotation of a camera that are contained within predetermined angular limits of rotation of the camera comprising:
   (a) a camera;
   (b) rotating means for rotating the camera within and between the predetermined angular limits of rotation;
   (c) reversing means for causing the direction of rotation of the camera to reverse when the camera reaches one of the predetermined angular limits;
   (d) means for selectively limiting the rotation of the camera to anyone of a plurality of different sectors contained within the predetermined angular limits, the means for selectively limiting rotation permitting the selection of any one of the plurality of different sectors within the predetermined angular limits of rotation; and
   (e) each sector being defined by a pair of reversing-switching means, the reversing-switching means being located at the limits of rotation and at one or more points located between the limits of rotation.

2. A system in accordance with claim 1 wherein the means for selectively limiting the rotation of the camera comprises:
   (a) means for producing a sector selection signal for initiating limitation of the rotation of the camera to a sector within the predetermined angular limits;
   (b) a plurality of switching means, each switching means being coupled to a different one of the reversing-switching means located between the angular limits of rotation; and
   (c) means responsive to the signal for activating one of the plurality of switching means to cause the reversing-switching means associated therewith to be coupled to the reversing means, each reversing-switching means producing a signal in response to rotation of the camera to the angular position of the reversing-switching means which causes the reversing means to reverse the direction of rotation of the camera when the switching means to which the reversing-switching means is coupled is activated.

3. A system in accordance with claim 2 further comprising an additional reversing-switching means disposed within the predetermined angular limits of rotation, the additional reverse switching means being coupled to the means for reversing rotation for causing the camera to reverse its direction of rotation in response to rotation of the camera to the angular position of the additional reversing-switching means, the additional reversing-switching means causing the camera to reverse its direction of rotation to a direction of rotation opposite the direction of rotation caused by the other reverse switching means which previously caused the direction of rotation of the camera to reverse.

4. A system in accordance with claim 2 further comprising:
   (a) means for a specified mode of operation of the camera from a group of possible modes of operation, the selection of any specified mode of operation causing a voltage to be generated which has a magnitude representative of only that specified mode of operation; and
   (b) a control means coupled to the means for choosing the possible voltage levels to produce a control signal which causes the generation of any specified camera control signal including the generation of the sector selection signal.

5. A system in accordance with claim 4 wherein the control means comprises:
   (a) a plurality of switch means coupled to receive the voltages from said means for selecting each of first switch means being activated when the voltage is above a corresponding predetermined level with the predetermined level for each of said first switch means being different and each of said first switch means providing at its respective output a switching signal upon being activated.

(b) a plurality of blocking means, each being coupled to the output of a respective one of said first switch means except for said first switching means corresponding to the lowest level input signal, and each of said blocking means providing a blocking signal upon receiving a first switching signal from the corresponding said first switch means;

(c) a plurality of output means, each being actuated by a corresponding one of said first switch means and said blocking means associated with said first switch means that is to be activated by the next higher level input signal, each of said output means providing at its output control signals upon receiving a switching signal from the corresponding said switch means unless said output means also receives a blocking signal from the associated said blocking means.

6. A system for changing the mode of operation of a camera comprising:
(a) a control system for selecting a first mode of operation of a camera comprising:
(b) means coupled to the control system for generating a change of mode of operation signal when the camera has operated in the selected mode for a time interval;
(c) means coupled to the means for generating for causing the control system to operate the camera in a second mode of operation upon the generation of the change of mode of operation signal and,
(d) one of the selected modes of operation being an auto scan function and the other mode of operation being for positioning of the camera at a predetermined position.

7. A system in accordance with claim 6 wherein the auto scan function is an auto pan scanning of the camera.

8. A system in accordance with claim 6 wherein the selected first mode of operation is the positioning of the camera at a predetermined position and the second mode of operation is an interval scan function.

9. A system in accordance with claim 6 wherein the selected first mode of operation is an auto scan function and the second mode of operation is the stopping of the scanning of the camera at the position at which the camera is positioned when the change of mode of operation signal is generated.

10. A system in accordance with claim 9 wherein the auto scan function is an auto scan function is an auto pan scanning of the camera.

11. A system in accordance with claim 6 wherein the selected first mode of operation is an auto scan function and the second mode of operation is an interval scan function.

12. A system in accordance with claim 11 wherein the auto scan function is an auto pan scanning of the camera.

13. A system for changing the mode of operation of a camera in accordance with claim 6 wherein the control means comprises:
(a) means for selecting a specified mode of operation of the camera from a group of possible modes of operation, the selection of any specified mode of operation causing a voltage to be generated which has a magnitude representative of only that specified mode of operation; and
(b) a control means coupled to the means for choosing for decoding the possible voltage levels to produce a control signal which causes the generation of any specified camera control signal including the generation of the sector selection signal.

14. A system in accordance with claim 13 wherein the control means comprises:
(a) a plurality of switch means coupled to receive the voltages from said means for selecting each of said first switch means being activated when the voltage is above a corresponding predetermined level with the predetermined level for each of said first switch means providing at its respective output a switching signal upon being activated;
(b) a plurality of blocking means, each being coupled to the output of a respective one of said first switch means except for said first switching means corresponding to the lowest level input signal, and each of said blocking signal upon receiving a first switching signal from the corresponding said first switch means;
(c) a plurality of output means, each being actuated by a corresponding one of said first switch means and said blocking means associated with said first switch means that is to be activated by the next higher level input signal, each of said output means providing at its output one of the control signals upon receiving a switching signal from the corresponding said switch means unless said output means also receives a blocking signal from the associated said blocking means.

* * * * *

UNITED STATES PATENT AND TRADEMARK OFFICE
CERTIFICATE OF CORRECTION

PATENT NO. : 4,543,609

DATED : September 24, 1985

INVENTOR(S) : William V. Smith

It is certified that error appears in the above—identified patent and that said Letters Patent is hereby corrected as shown below:

```
Column  3, line 66, change "disgram" to --diagram--.
Column  4, line 20, change "dependant" to --dependent--.
Column  7, line 21, change "tp" to --to--;
           line 56, change "h-gh" to --high--.
Column  8, line 38, change "inegrate" to --integrate--.
Column  9, line  4, change "with in" to --within--.
Column 10, line 12, change "tuaged" to --tuated--;
           line 27, change "lef-going" to --left-going--.
Column 11, line 34, change "It" to --If--.
Column 12, line  8, change "anyone" to --any one--.
Column 13, line  6, change "." to --;--.
Column 14, line  4, delete "auto scan function is an" (first
                                                 occurrence).
Column 14, line 34, after "means" insert --being different
           and each of said first switch means--;
           line 40, after "blocking", insert --means providing
           a blocking--;
           line 48, delete "one of the".
Column  7, line 22, change "turmed" to --turned--.
```

Signed and Sealed this

Twenty-fifth Day of February 1986

[SEAL]

Attest:

DONALD J. QUIGG

Attesting Officer

Commissioner of Patents and Trademarks